United States Patent
Moller

[19]

[11] Patent Number: 5,930,302
[45] Date of Patent: Jul. 27, 1999

[54] BALANCED PHASE DATA BUS TRANSMITTER

[75] Inventor: David Dale Moller, Westfield, Ind.

[73] Assignee: Delco Electronics Corp., Kokomo, Ind.

[21] Appl. No.: 08/798,348

[22] Filed: Feb. 10, 1997

[51] Int. Cl.$^6$ .................................................. H04K 1/02
[52] U.S. Cl. ........................ 375/296; 375/257; 375/376; 330/253
[58] Field of Search ..................................... 375/257, 376, 375/318, 296; 330/253, 284, 295, 254, 257, 259; 327/52, 108

[56] References Cited

U.S. PATENT DOCUMENTS

| | | | |
|---|---|---|---|
| 5,376,899 | 12/1994 | Pass | 330/253 |
| 5,432,817 | 7/1995 | Hormel et al. | 375/257 |
| 5,684,831 | 11/1997 | Moller | 375/257 |
| 5,767,703 | 6/1998 | Fattori et al. | 327/108 |

*Primary Examiner*—Stephen Chin
*Assistant Examiner*—Shuwang Liu
*Attorney, Agent, or Firm*—Jimmy L. Funke

[57] ABSTRACT

A transmitter for a differential serial data communication bus incorporating the CAN format includes features for minimizing radiated emissions. The transmitter includes a second order input filter for establishing a slew rate of pulses edges and for rounding corners, a first amplifier for attenuating and level shifting the filtered input to produce a first bus output, and a second amplifier coupled to the first bus output for producing a second bus output mirroring the first. The second amplifier has a high unity gain frequency and a closed loop configuration, both for minimizing phase differential of the two outputs.

4 Claims, 3 Drawing Sheets

BALANCED PHASE DATA BUS TRANSMITTER

FIELD OF THE INVENTION

This invention relates to differential serial data communication and particularly to a data bus transmitter for producing balanced phase signals.

BACKGROUND OF THE INVENTION

Data communication in automotive vehicles sometimes takes the form of a controller area network (CAN) which was developed for factory operations. The CAN bus is a differential serial data communication bus using a twisted pair of lines respectively carrying high signal (CANH) and a low signal (CANL). Data is self synchronizing because of it's variable pulse width protocol. The bus has two states: a recessive bit where there is a 0 VDC differential between CANH and CANL, and a dominant bit where there is a 2 VDC differential. The CAN International Standard (ISO 11898) has provisions for only controlled slew rates for both outputs. There is no phasing requirements for CANH and CANL with respect to each other.

Although CAN is useful for vehicle applications it produces an objectionable level of radiated emissions. To minimize radiated emissions during high speed transmissions, the phase of the signals must be kept as close to zero as possible, i.e. CANH+CANL equal a constant DC voltage.

SUMMARY OF THE INVENTION

It is therefore an object of the invention to minimize radiated emissions in a differential serial data bus. Another object in such a bus is for transmission apparatus to produce differential signals substantially in phase.

A data transmitter has a wave-shaping filter at its input which establishes a slew rate of the data pulses and also smoothes the transitions at pulse corners. A level shifting and attenuating amplifier offsets the signal to a reference voltage to produce a first CAN voltage, and an inverting unity gain amplifier with high bandwidth and responsive to the first CAN voltage produces a second CAN voltage at the reference voltage and which mirrors the first CAN voltage. Due to the high bandwidth the second CAN voltage can maintain zero phase with the first CAN voltage. To further assist the zero phase of the signals, the second CAN voltage is fed back to the inverting unity gain amplifier.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
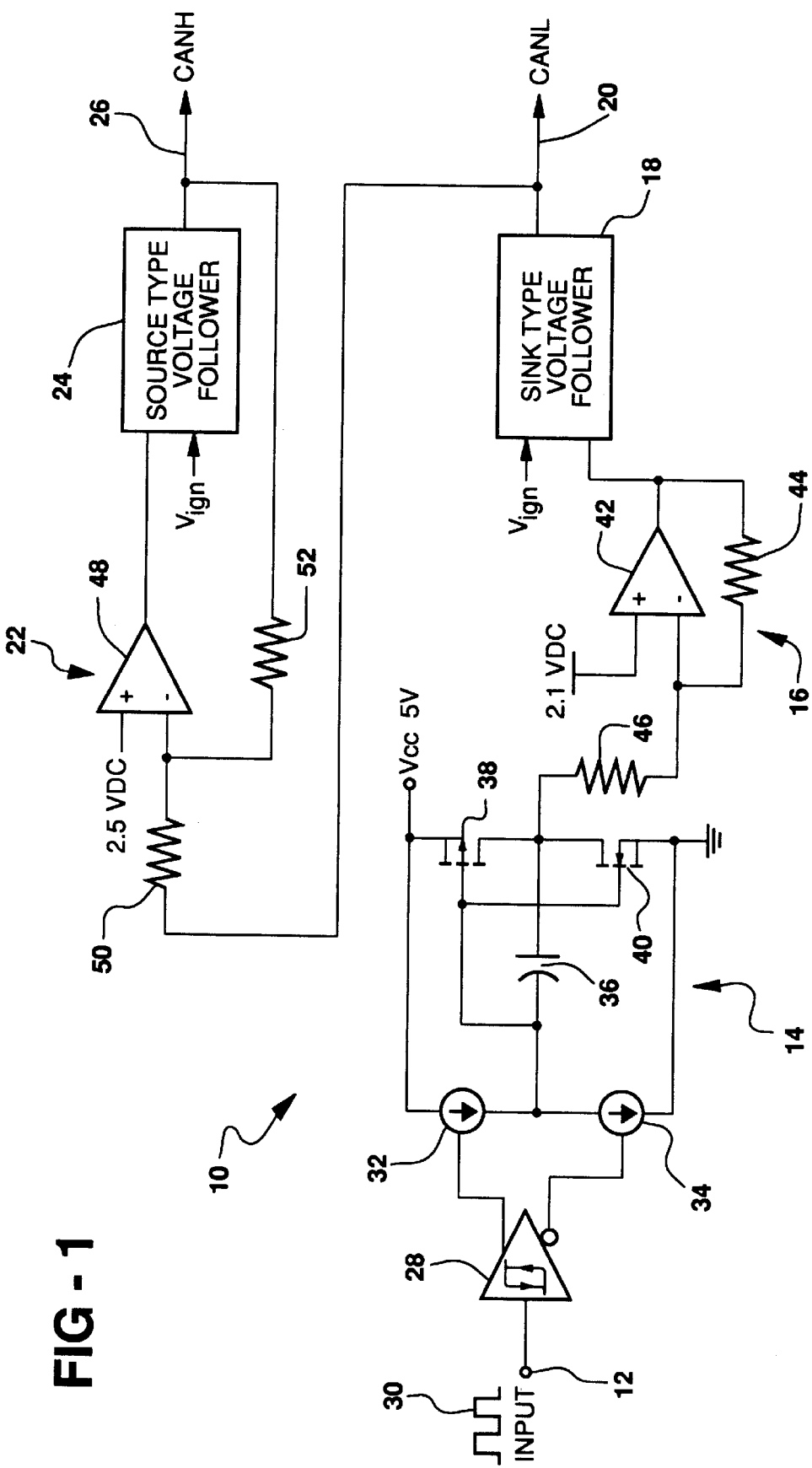
FIG. 1 is a schematic diagram of a data bus transmitter according to the invention.

Referring to FIG. 1, a transmitter 10 for a CAN differential serial data communication bus has an input terminal 12 connected to a waveshaping filter 14 which provides filtered pulses to a first amplifier 16. A sink type voltage follower 18 responsive to the amplifier output produces an output signal CANL on a bus line 20. A second amplifier 22 has its inverting input connected to the bus line 20 to produce an inverted form or mirror of the signal CANL. This second amplifier signal is fed to a source type voltage follower 24 which produces the signal CANH on bus line 26. The signal CANH is fed back to the input of the second amplifier. The first and second amplifiers are biased so that they both yield the same output voltage, preferably 2.5 v, when the input signal is zero, and they symmetrically diverge from the 2.5 v reference level for a higher voltage signal.

The waveshaping filter 14 has a comparator 28 with hysteresis as the input element and receives a square wave data pulse 30. The comparator is set to switch to one state when its input goes above 2 volts and to switch to the other state when the input goes below 0.8 volt. A non-inverted comparator output is coupled to a constant current source 32 and an inverted output is coupled to a constant current sink 34 so that those elements 32 and 34 conduct alternately according to the state of the input signal. The current source 32 and sink 34 are serially coupled between a 5 volt supply Vcc and ground. Their junction is connected to one side of a capacitor 36, the other side being connected to the filter output. The junction is also connected to the gates of MOSFETS 38 and 40. The FET 38 is a P-channel device, its source connected to Vcc and its drain connected to the filter output. The FET 40 is an N-channel device having its source connected to the filter output and its drain is coupled to ground.

In operation, the input pulse causes the comparator to switch on and off to correspondingly turn the current source 32 and sink 34 alternatively on and off to charge and discharge the capacitor 36 which affects the conduction of the MOSFETS 38 and 40. The slew rate of the filter output is fixed by the capacitor and the current limits of the current source and sink, and second order filtering at the extremes of the voltage swings effects smooth transition of the pulse edges with the maxima and minima of the waveform. The overall result is a two-stage filtering which establishes fixed slew rates for rising and falling pulse edges and rounded corners at the transition points of edges and horizontal portions of the wave shape.

The first amplifier 16 is a level shifting and attenuating amplifier including an operational amplifier 42 with its non-inverting input connected to 2.1 v and its inverting input connected to its output through a feedback resistor 44 and to the filter output through an input resistor 46 having a value 5 times the value of resistor 44. These values afford an output of 2.5 v when the filtered input is ground and about 1.5 v when the input is at $V_{cc}$ but following the shape of the filtered signal. The sink type voltage follower 18 is a unity gain amplifier which replicates the amplifier output onto the bus line 20 to produce the low signal CANL.

The second amplifier 22 comprises an operational amplifier 48 having its non-inverting input connected to a 2.5 v reference and its inverting input coupled through an input resistor 50 to the line 20 and through a feedback resistor 52 to the line 26. The second amplifier produces a mirror of the CANL signal which is applied to the line 26 by the voltage follower 24 which is another unity gain amplifier. The CANH signal varies between 2.5 v and about 3.5 v.

The unity gain frequency of operational amplifier 42 should be in the 2 to 5 MHz range. The unity gain frequency of the operational amplifier 48 must be as high as possible to minimize CANH to CANL phase delay. A unity gain frequency of 70 MHz has been found to be suitable to greatly enhance the ability of amplifier 48 to follow the CANL waveform. Any phase delay is further minimized by the closed loop from CANL back to the operational amplifier 48 input.

Figure 2A:
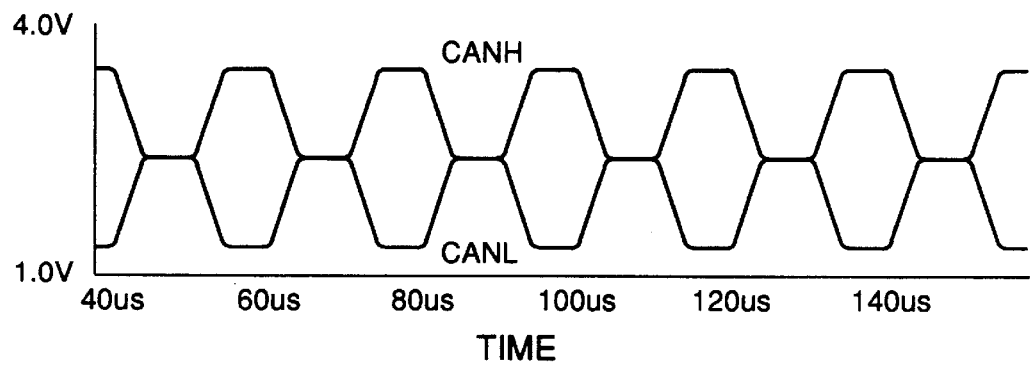
FIGS. 2A and 2B are waveforms produced by the circuit of FIG. 1 depicting bus signals both separately and summed.
Figure 2B:
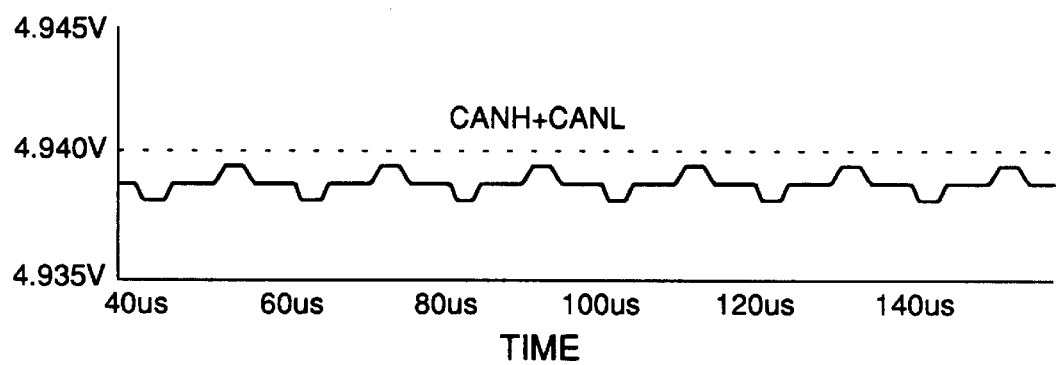
Figure 3:
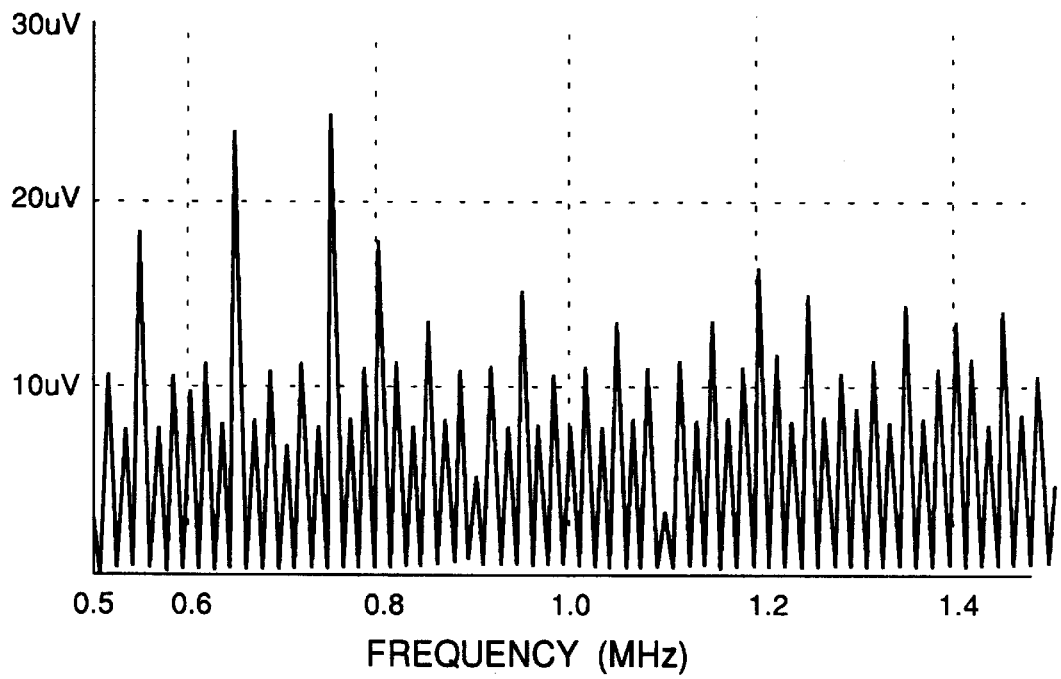
FIG. 3 is a graph representing a frequency spectrum of radiated emissions resulting from the outputs of the circuit of FIG. 1.
Figure 4A:
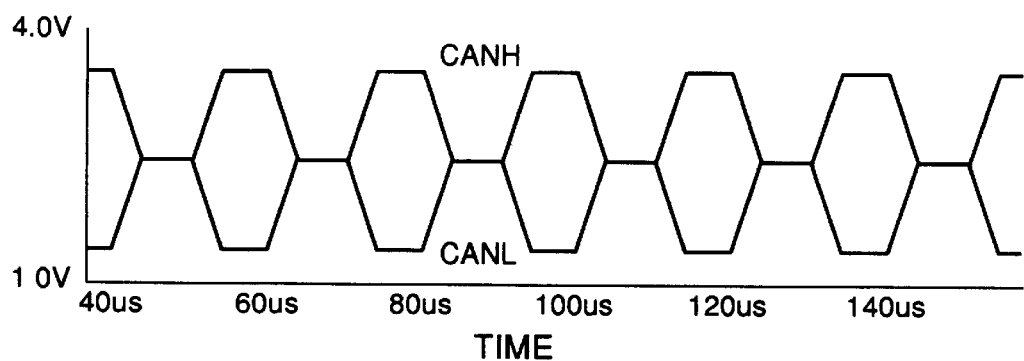
FIGS. 4A and 4B are waveforms produced by a circuit lacking the inventive features of FIG. 1 depicting bus signals both separately and summed.
Figure 4B:
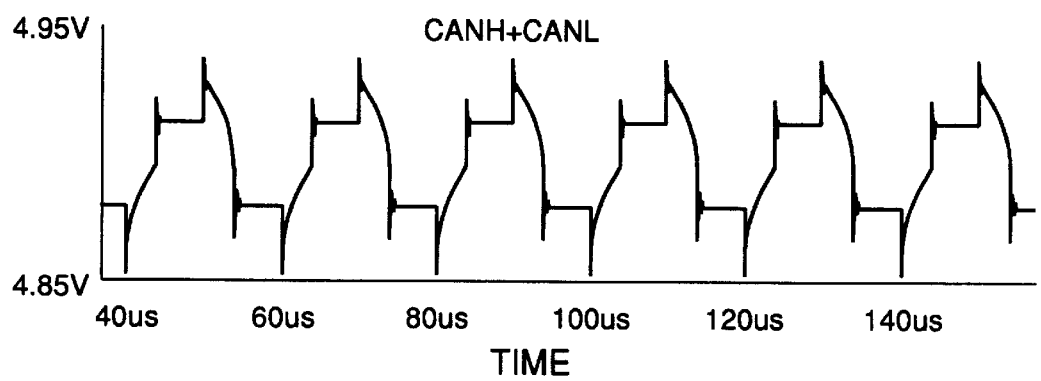
Figure 5:
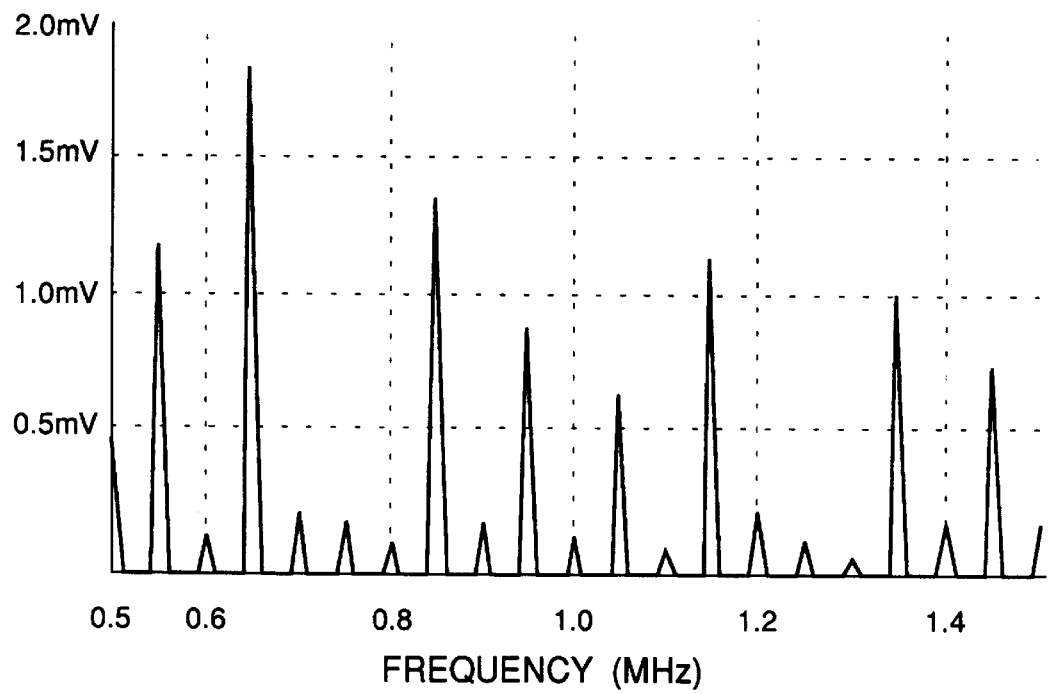
FIG. 5 is a graph representing a frequency spectrum of radiated emissions resulting from the waveforms of FIGS. 4A and 4B.

Three features of the transmitter circuit contribute to the waveforms and small phase difference of the CAN signal which in turn result in low radiated emissions. The features are the waveshaping filter 14 with second order filtering for rounding the corners of the waveform, the high unity gain frequency of the second amplifier, and the closed loop design of the second amplifier to minimize the phase difference. In combination, these three features yield waveforms shown in FIGS. 2A, 2B and 3. FIG. 2A shows the signals CANL and CANH with rounded corners and FIG. 2B shows the sum of CANL and CANH which is a nearly constant voltage just below 5 v and has only a little ripple. The radiated emissions resulting from this circuit is represented by the frequency spectrum of FIG. 3. There the maximum voltage is about 25 µv. In contrast, a similar circuit having a slew rate control only without second order filtering, using 3 MHz operational amplifiers, and an open loop second amplifier configuration yields the waveforms shown in FIGS. 4A, 4B and 5. FIG. 4A shows the sharp corners of the signals CANL and CANH, and FIG. 4B shows the large signal discontinuities in the sum of CANL and CANH. The radiated emissions shown in FIG. 5 reveals several voltage spikes exceeding 1 mv. The overall measure of radiated emissions shows a reduction of 40 dBm resulting from the three circuit improvements.

It will thus be recognized that by optimizing the transmitter circuit operation that CAN bus systems can be applied to vehicles and still comport with strict standard for radiated emissions. It is further apparent that due to the simplicity of the circuit configuration, the great improvement in performance achieved by the invention is achievable with minimal cost increment, if any.

The embodiments of the invention in which an exclusive property or privilege is claimed are defined as follows:

1. A transmitter for a differential serial data communication comprising:

filter means for receiving a data input signal including a series of pulses to form a filtered input signal having a controlled slew rate and smooth pulse edges;

first amplifier means coupled to the filter means for level shifting the filtered input signal to produce a first output signal; and unity gain amplifier means coupled to the first amplifier means for inverting the first output signal to form a second output signal that mirrors the first output signal, the unity gain amplifier means having a sufficiently high frequency response to minimize any phase difference between the first and second output signals.

2. A transmitter for a differential serial data communication bus having first and second lines comprising:

filter means having a data input for receiving an input signal including a series of pulses to form a filtered input signal having a controlled slew rate and smooth pulse edges;

a first amplifier coupled to the filter means for producing a first output signal based on the filtered input signal;

means for coupling the first output signal to the first line;

a second amplifier having an inverting input coupled to the first output signal for producing a second output signal which mirrors the first output signal; and means for coupling the second output signal to the second line.

3. The invention as defined in claim 2 including:

feedback means connecting the second line to the inverting input of said second amplifier; and the second amplifier having a sufficiently high unity gain frequency to minimize any phase difference between the first and second output signals.

4. The invention as defined in claim 2 wherein:

the first amplifier including means for producing first output signal by attenuating the filtered input signal and shifting to a new reference voltage; and the second amplifier references the second output signal to the reference voltage.

* * * * *